United States Patent
Wolfe et al.

(10) Patent No.: US 7,165,507 B2
(45) Date of Patent: Jan. 23, 2007

(54) METHODS AND APPARATUS FOR ACCURATELY POSITIONING A DEVICE WITHIN THE SUBGERMINAL CAVITY OF AVIAN EGGS

(75) Inventors: Stephen P. Wolfe, Chapel Hill, NC (US); Dipak Mahato, Raleigh, NC (US); Phillip L. Rybarczyk, Jr., Chapel Hill, NC (US)

(73) Assignee: Embrex, Inc., Durham, NC (US)

( * ) Notice: Subject to any disclaimer, the term of this patent is extended or adjusted under 35 U.S.C. 154(b) by 0 days.

(21) Appl. No.: 11/254,938

(22) Filed: Oct. 20, 2005

(65) Prior Publication Data

US 2006/0102082 A1    May 18, 2006

Related U.S. Application Data

(60) Provisional application No. 60/621,964, filed on Oct. 25, 2004.

(51) Int. Cl.
*A01K 43/00* (2006.01)
(52) U.S. Cl. ..................................... 119/6.8
(58) Field of Classification Search ............ 119/6.8; 604/65
See application file for complete search history.

(56) References Cited

U.S. PATENT DOCUMENTS

| | | | |
|---|---|---|---|
| 6,244,214 B1 * | 6/2001 | Hebrank | 119/6.8 |
| 6,582,393 B1 * | 6/2003 | Sage, Jr. | 604/65 |
| 6,585,675 B1 * | 7/2003 | O'Mahony et al. | 604/4.01 |
| 6,623,470 B1 * | 9/2003 | Munis et al. | 604/503 |

* cited by examiner

*Primary Examiner*—Robert P. Swiatek
(74) *Attorney, Agent, or Firm*—Myers Bigel Sibley & Sajovec

(57) ABSTRACT

Methods an apparatus for accurately and reliably positioning a device within an egg are provided. An opening is formed within a portion of the shell of an egg and a device is extended through the opening. The device includes a needle having a lumen containing a fluid under pressure. Fluid pressure is monitored and, in response to detecting a change in pressure of the fluid, movement of the device is stopped. Alternatively, fluid flow is monitored and, in response to detecting fluid flow from the needle, movement of the device is stopped. The device may be a substance delivery device that is configured to deliver a substance into the subgerminal cavity of the egg. The device may be a substance removal device that is configured remove a substance from an egg.

33 Claims, 4 Drawing Sheets

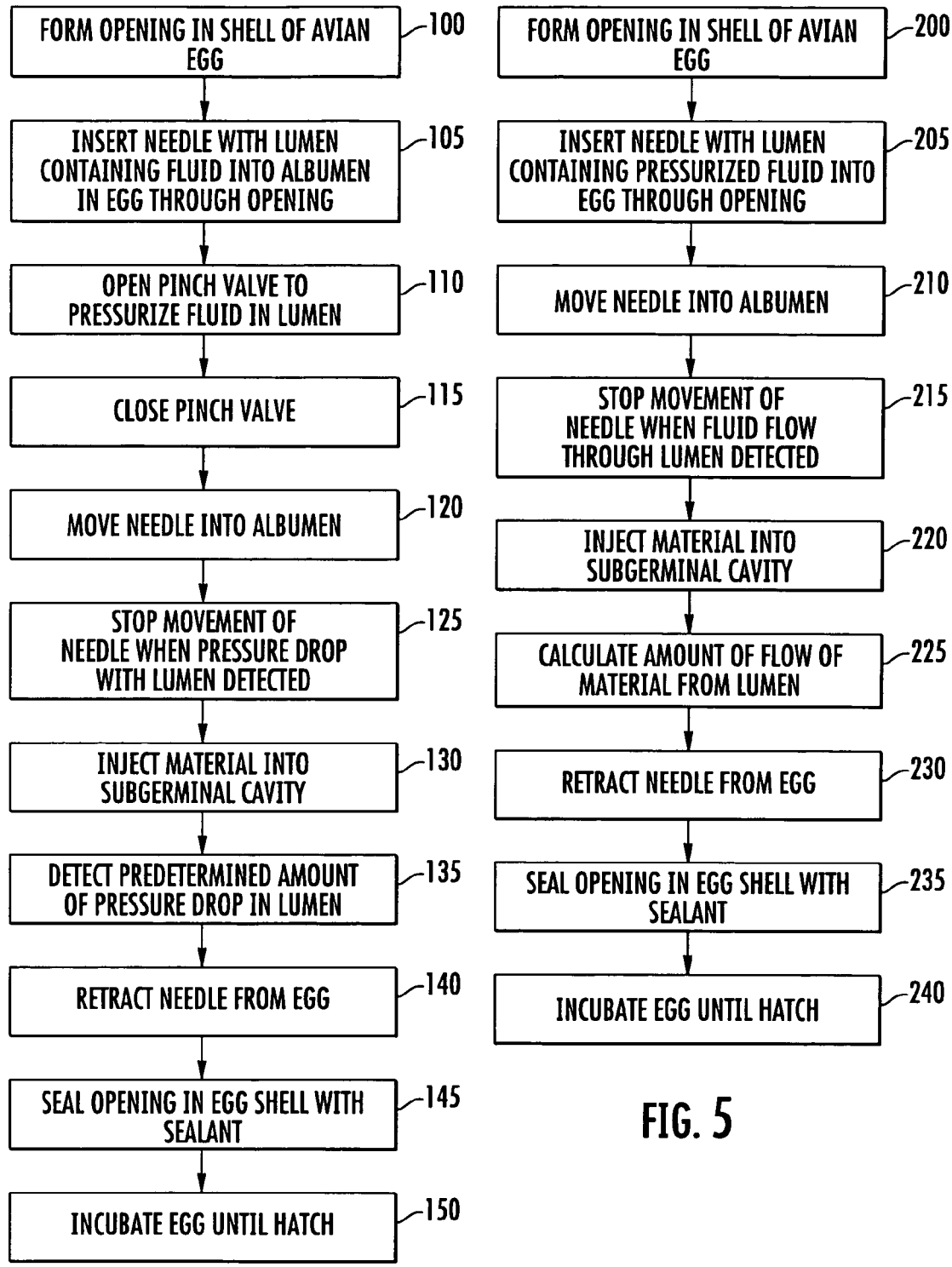

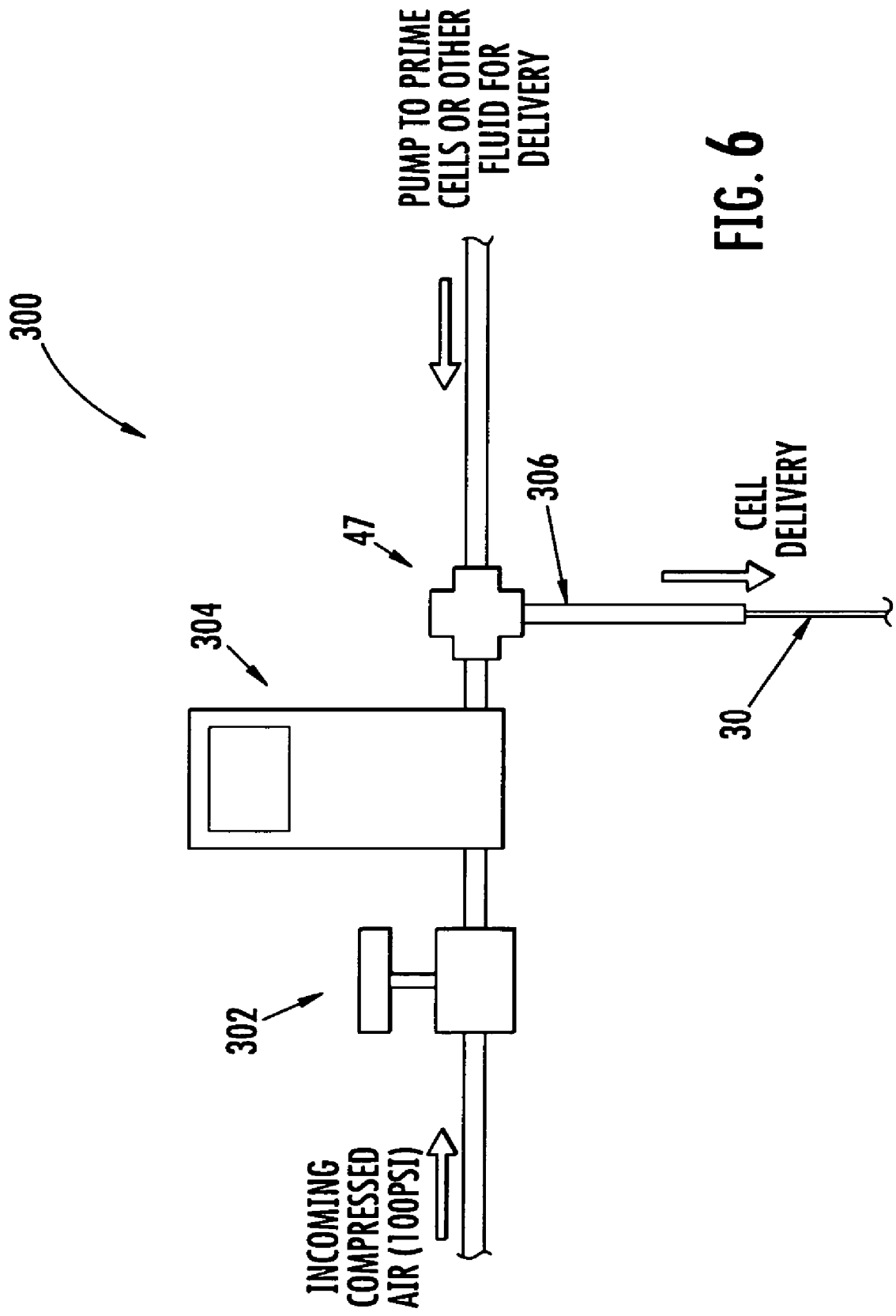

US 7,165,507 B2

METHODS AND APPARATUS FOR ACCURATELY POSITIONING A DEVICE WITHIN THE SUBGERMINAL CAVITY OF AVIAN EGGS

RELATED APPLICATION

This application claims the benefit of and priority to U.S. Provisional Patent Application No. 60/621,964 filed Oct. 25, 2004, the disclosure of which is incorporated herein by reference as if set forth in its entirety.

FIELD OF THE INVENTION

The present invention relates generally to eggs and, more particularly, to egg processing systems and methods.

BACKGROUND OF THE INVENTION

In poultry hatcheries and other egg processing facilities, eggs are handled and processed in large numbers. The term "processing" includes, but is not limited to, treating live eggs with medications, nutrients, hormones and/or other beneficial substances while the embryos are still in the egg (i.e., in ovo). In ovo injections of various substances into avian eggs have been employed to decrease post-hatch morbidity and mortality rates, increase the potential growth rates or eventual size of the resulting bird, and even to influence the gender determination of the embryo. Injection of vaccines into live eggs has been effectively employed to immunize birds in ovo.

Referring now to FIG. 1, an avian egg 10 is illustrated. The illustrated egg 10 includes a shell 12, an outer shell membrane 14, an inner shell membrane 16, and an air cell 18 at the blunt end of the egg 10 between the inner and outer shell membranes 14, 16. The illustrated egg 10 also includes a yolk 20 and blastoderm 22 surrounded by inner thin albumen 24a, outer thick albumen 24b, and outer thin albumen 24c. The blastoderm 22 is a cellular disc several cells deep that sits atop a "subgerminal cavity" 26 (FIG. 2). The edges of the blastoderm disc 22 are attached to the yolk 20.

Currently, to produce chimeric chickens, cells are injected into the subgerminal cavity of an avian egg by puncturing the blastoderm with a needle and delivering the cells into the subgerminal cavity. However, because the subgerminal cavity within an avian egg is very small, accurate delivery of cells into the subgerminal cavity can be difficult. Moreover, an operator may have little or no control over the depth that a needle is extended into the subgerminal cavity. In addition, the size and depth of a subgerminal cavity can vary from egg to egg. As such, injection of cells into the subgerminal cavity is typically referred to as "blind injection" because it may not be possible to know whether cells have actually been inserted within the subgerminal cavity of an egg until a chick hatches and can be tested for chimerism. Accordingly, there is a need in the art for improved methods of reliably and accurately positioning devices within the subgerminal cavity of avian eggs.

SUMMARY OF THE INVENTION

In view of the above discussion, methods an apparatus for accurately and reliably positioning a device within an egg are provided. According to embodiments of the present invention, an opening is formed within a portion of the shell of the egg and a device is extended through the opening. The device includes a needle having a lumen containing a fluid under pressure. Fluid pressure is monitored and, in response to detecting a change in pressure of the fluid, movement of the device is stopped. Alternatively, fluid flow is monitored and, in response to detecting fluid flow from the needle, movement of the device is stopped.

Embodiments of the present invention allow accurate and reliable location of a needle within the subgerminal cavity of an egg. According to embodiments of the present invention, the device may be a substance delivery device that is configured to deliver a substance (e.g., cells, vaccines, nucleic acids, proteins, peptides, viruses, antigens, hormones, growth factors, cytokines, etc.) into the subgerminal cavity of the egg. According to other embodiments of the present invention, the device may be a substance removal device that is configured remove a substance from an egg.

BRIEF DESCRIPTION OF THE DRAWINGS

FIGS. 4 and 5 are flow charts that illustrate methods of reliably and accurately positioning a needle within the subgerminal cavity of an avian egg, according to embodiments of the present invention.

FIG. 6 illustrates a flow sensing system for use in reliably and accurately positioning a needle within the subgerminal cavity of an avian egg, according to embodiments of the present invention.

DETAILED DESCRIPTION OF THE INVENTION

Figure 1:
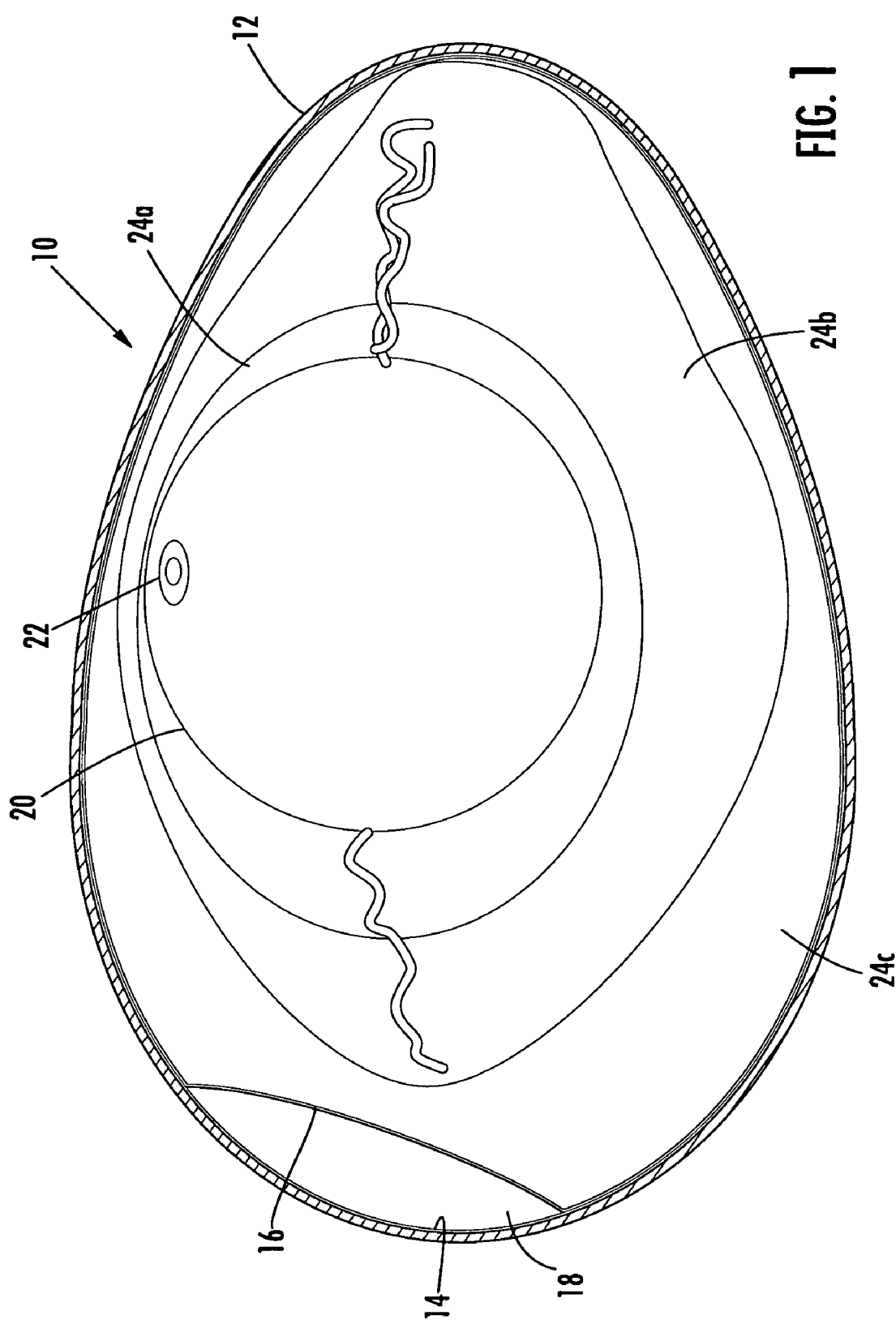
FIG. 1 is a side section view of an avian egg.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

The terms "avian" and "avian subjects," as used herein, are intended to include males and females of any avian species, but are primarily intended to encompass poultry which are commercially raised for eggs, meat or as pets. Accordingly, the terms "avian" and "avian subject" are particularly intended to encompass various birds including, but not limited to, chickens, turkeys, ducks, geese, quail, pheasant, parakeets, parrots, cockatoo, cockatiel, ostrich, emu, etc.

As used herein, the term "early embryo" refers to an avian embryo from the time of lay (blastodermal stage) through about the developmental stage where primordial germ cells (PGCs) are migrating. With particular respect to chicken embryos, an "early embryo" is generally about an embryonic stage 20 (H&H) embryo or earlier. The developmental stages of the chicken embryo are well-understood in the art, see e.g., The Atlas of Chick Development, R. Bellairs & M. Osmond, eds., Academic Press, 1998.

As used herein, the term "blastoderm" has its understood meaning in the art. Generally, a blastoderm includes an embryo from the time of lay through the end of gastrulation. The blastoderm is sometimes referred to by the alternative designations "germinal disc" or "embryonic disc" in the art. A blastoderm may be described as a flattened disc of cells that forms during cleavage in the early embryo and persists until the end of gastrulation. By the time of laying, two major regions of the blastoderm are visible, the centrally-situated area pellucida and the peripherally-located area opaca (The Atlas of Chick Development, R. Bellairs & M. Osmond, eds., Academic Press, 1998). With particular respect to chicken embryos, the blastoderm is typically characterized as an embryo from the time of lay (i.e., Stage IX or Stage X EG&K) through about stage XIII (EG&K) or higher.

As used herein, the terms "injection" and "injecting" encompass methods of inserting a device into an egg or embryo, including methods of delivering or discharging a substance into an egg or embryo, methods of removing a substance (i.e., a sample) from an egg or embryo, and/or methods of inserting a detector device into an egg or embryo.

The terms "chimeric bird" or "chimeric embryo" refer to a recipient bird or embryo, respectively, that contains cells from another bird or embryo, referred to as a "donor." The terms "transgenic bird" and "transgenic embryo" are used herein in accordance with their generally understood meanings in the art. A transgenic bird or transgenic embryo contains a foreign nucleic acid sequence in one or more cells.

As used herein, the term "membrane" refers to any layer of tissue within an egg. Exemplary membranes within an egg include, but are not limited to, the outer shell membrane, inner shell membrane, chorio-allantoic membrane, VM membrane, and amniotic membrane (amnion).

As used herein, the terms "needle", "pipette", and "micropipette" are intended to be interchangeable.

Figure 2:
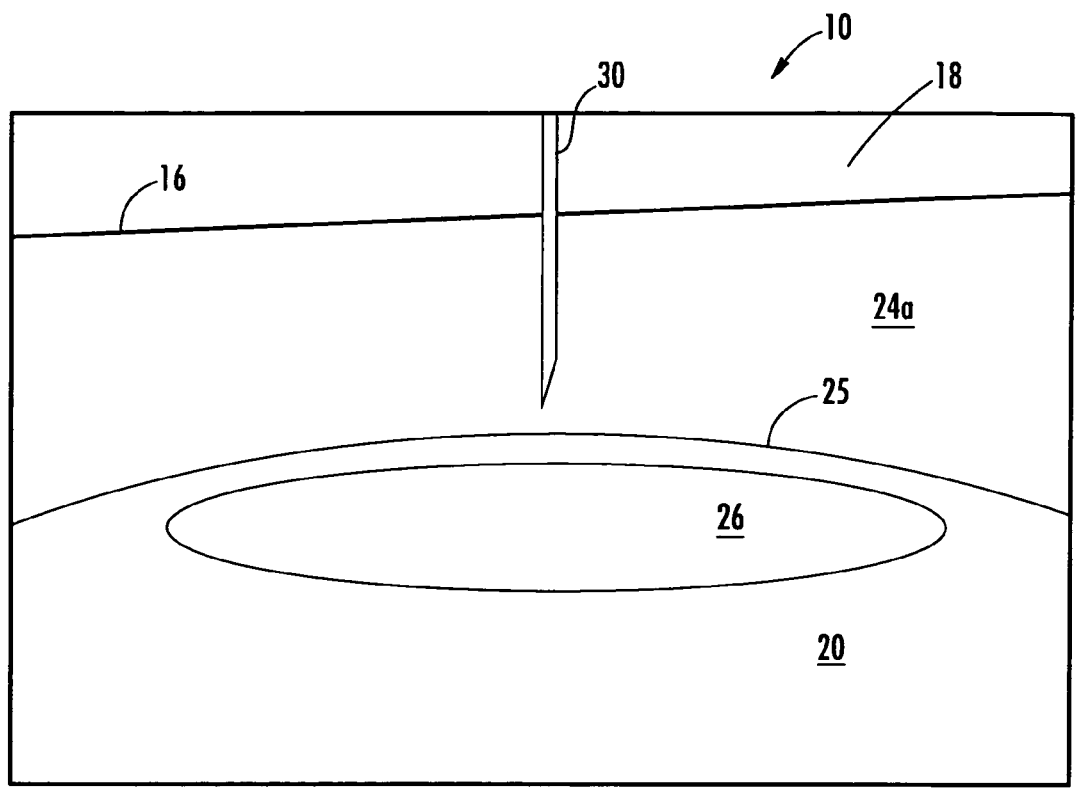
FIG. 2 is an enlarged partial section view of the avian egg of FIG. 1 with a needle being inserted into the subgerminal cavity thereof.

Referring to FIG. 2, an avian egg 10 with a needle 30 being inserted into the subgerminal cavity 26 thereof, in accordance with embodiments of the present invention, is illustrated. The needle 30 contains a lumen through which fluid to be deposited within the subgerminal cavity 26 of the egg is delivered, as would be understood by those skilled in the art. A pressure sensing system 40 (FIG. 3) is utilized to accurately determine when the tip of needle 30 passes the vitelline membrane 25 and enters the subgerminal cavity 26. The pressure sensing system 40 operates on the principle that fluid retained within the needle 30 is held to some extent by surface tension between the walls of the needle lumen. In order for fluid to flow out of the lumen outlet in the needle tip when the needle tip is surrounded by air, a minimum pressure must be applied to the other end of the lumen (i.e., the lumen inlet), as would be understood by those skilled in the art. However, if the lumen outlet is submerged in a liquid, such as water, the surface tension is substantially removed and fluid within the lumen will flow out of the lumen with much less pressure applied to the lumen inlet, also as well understood by those skilled in the art.

Applicants have discovered that a significantly greater pressure at the lumen inlet is required to cause flow through the lumen when the lumen outlet is inserted within albumen compared to when the lumen outlet is disposed within air. Although not wanting to be held to any particular theory, Applicants believe that this may be due, at least in part, to the high viscosity of albumen, as compared with other fluids within an egg. Applicants further believe that subgerminal fluid in the subgerminal cavity has characteristics similar to water which requires much lower pressure to cause fluid flow from the lumen outlet as compared with air. The difference between pressure required to cause fluid flow when the needle is disposed within albumen as compared with when the needle is disposed within the subgerminal cavity, allows for accurate determination of when the needle is positioned within the subgerminal cavity via a pressure sensor.

Figure 3:
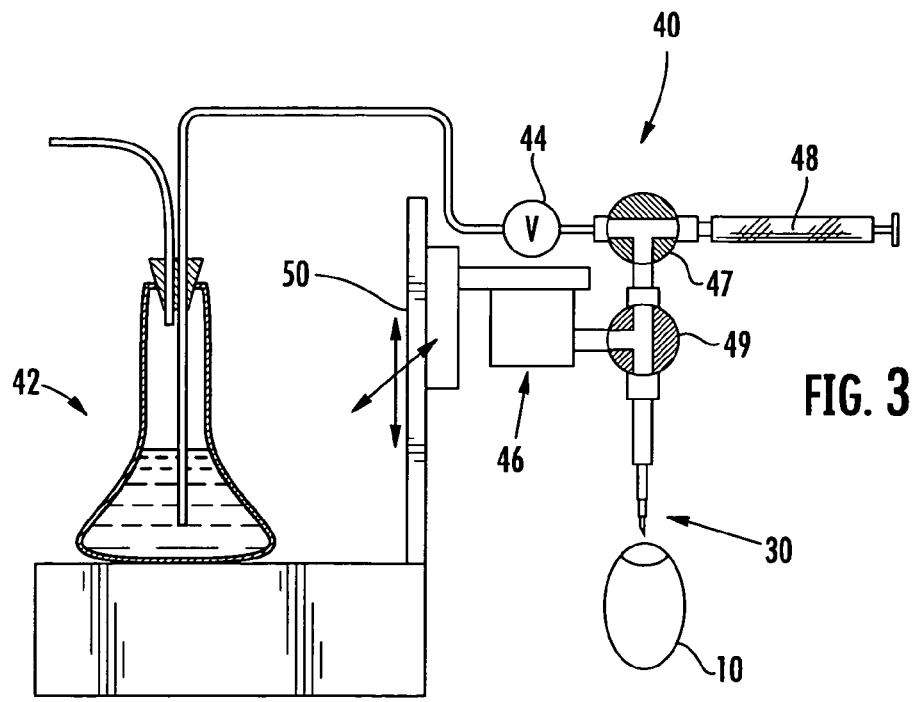
FIG. 3 illustrates a pressure sensing system for use in reliably and accurately positioning a needle within the subgerminal cavity of an avian egg, according to embodiments of the present invention.

Referring to FIG. 3, a pressure sensing system 40 configured to reliably and accurately detect when a needle tip is inserted within the subgerminal cavity of an avian egg, according to embodiments of the present invention, is illustrated. The illustrated system 40 includes a pressure reservoir 42, a pinch valve 44, a pressure transducer 46, a loading syringe 48, and a linear slide 50. A micropipette 30 (which serves the function of a needle described above) is configured to deliver material (e.g., cells, vaccines, nucleic acids, proteins, peptides, viruses, antigens, hormones, growth factors, cytokines, etc.) into the subgerminal cavity of an avian egg. The micropipette 30 contains a fluid and is pressurized by the pressure reservoir 42 to a predetermined pressure. This predetermined pressure is a pressure where fluid will not flow through the micropipette 30 when the micropipette tip is located in albumen but will flow through the micropipette 30 when the micropipette tip passes into the subgerminal cavity. The pressure transducer 46 detects a change in pressure in the fluid in the micropipette 30 as the tip of the micropipette 30 moves into the subgerminal cavity (which causes the fluid to flow out of the micropipette 30).

Pressure reservoir 42 may be a source of compressed air or other gas that is connected to a container via a gas inlet and has a tube running from the fluid region of the container up to a liquid outlet. In the illustrated embodiment, a three-way valve 47 is positioned between pinch valve 44 and loading syringe 48. The pinch valve 44 facilitates pressurization of the micropipette 30 via pressure reservoir 42. The three-way valve 47 isolates the loading syringe 48 when the micropipette 30 is being pressurized and isolates the pressure reservoir 42 when fluid is loaded into the micropipette 30 via loading syringe 48. Three-way valve 49 isolates the pressure transducer 46 when fluid is loaded into the micropipette 30 via loading syringe 48.

The linear slide 50 may be a conventional X-Y table, which is well known to those skilled in the art. The linear slide 50 accurately controls movement of the micropipette 30. The pressure transducer 46 is configured to detect a change in pressure of the fluid within the micropipette lumen.

The pressure sensing system 40 is preferably under computer control. As such, a signal from the pressure transducer can be utilized to control movement of the micropipette 30.

According to other embodiments wherein a flow sensor is utilized, a signal from the flow sensor can be utilized to control movement of the micropipette 30.

Embodiments of the present invention have many advantages. For example, embodiments of the present invention can provide a more reliable method of delivering cells and other materials to the subgerminal cavity of avian eggs than conventional methods. Moreover, utilizing a pressure sensing system according to embodiments of the present invention provides feedback to determine when cell delivery into the subgerminal cavity has occurred. The use of a linear slide 50 to precisely control the depth of the injection needle is also advantageous. The linear slide gives controlled movement of the needle. When injection is performed by hand, there is no way to know if lateral hand movement is present causing the vitteline membrane and/or other inner shell membrane to tear or if there is excess vertical movement placing the needle too deep into areas below or above the subgerminal cavity. In addition, pressure drop may correlate linearly with volume delivered thereby providing a very accurate method for delivering precise volumes (e.g., within 0.1 micro-liters).

FIG. 4 is a flow chart that illustrates methods of accurately positioning a device in the subgerminal cavity of an egg and delivering material thereto, according to embodiments of the present invention. It should be noted that the functions noted in the blocks may occur out of the order noted in FIG. 4. Two (or more) blocks shown in succession may in fact be executed substantially concurrently or the blocks may sometimes be executed in the reverse order, depending on the functionality involved.

Initially, an opening is formed in the shell of an avian egg (Block 100). The opening may be formed in various ways including via a punch or other device known to those skilled in the art. In addition, the opening may be formed in any suitable location, e.g., in the side of the egg near the equatorial axis, at either end of the egg, etc. In one embodiment of the invention, the opening in the egg shell is introduced at the upward facing portion of the shell of a generally horizontally positioned egg. However, embodiments of the present invention are not limited to any particular orientation of an egg.

According to embodiments of the present invention, the surface of an egg, at least around the site of formation of the opening for example, may be sanitized to reduce microbial (or other) contamination (e.g., with an alcohol or other sanitizing solution). However, sanitizing an egg, including the site of the opening, is not required with respect to embodiments of the present invention.

A needle with a lumen containing a fluid is inserted into the albumen of the egg via the opening (Block 105). The fluid within the needle lumen is pressurized (e.g., at about five to twenty inches of water) by opening a pinch valve 44 (Block 110) and the pressure is monitored by a pressure sensing system as described above with respect to FIG. 3. The pinch valve 44 is then closed (Block 115) and the needle is moved into and through the albumen (Block 120). When a pressure drop within the lumen is detected, the movement of the needle is stopped and the lumen outlet of the needle is located within the subgerminal cavity of the egg (Block 125). A fluid material flows into the subgerminal cavity because of the pressure drop (Block 130). The fluid that flows from the lumen may be the material that is to be delivered into the egg (e.g., fluid containing cells, vaccines, nucleic acids, proteins, peptides, viruses, antigens, hormones, growth factors, cytokines, etc.). Alternatively, material that is to be delivered into an egg may follow the initial fluid that flows because of the pressure drop.

When a predetermined pressure drop within the lumen is detected (Block 135), which correlates to a predetermined volume of liquid being delivered into the subgerminal cavity, the device is retracted from the egg (Block 140). The opening in the egg shell may be sealed with a sealant (Block 145) and the egg may be incubated until hatch (Block 150).

According to other embodiments of the present invention, a low flow sensor or mass flow sensor may be used instead of a pressure sensor. In such an embodiment, the flow sensor may be placed in series (or flow through) as opposed to the pressure sensor that is manifolded off the side of the flow path. This could allow for reductions in both flow path and flow volume as compared with a pressure sensing system described above. This system could utilize a liquid or gas flow sensor. If a gas flow sensor were used, it would eliminate the pressure reservoir as the gas pressure would be directly applied to the fluid line after the flow sensor, but before the micropipette or needle. Therefore the gas/fluid interface would be inside the tubing as opposed to inside a pressure reservoir.

FIG. 5 is a flow chart that illustrates methods of accurately positioning a device in the subgerminal cavity of an egg and delivering material (e.g., cells, vaccines, nucleic acids, proteins, peptides, viruses, antigens, hormones, growth factors, cytokines, etc.) thereto, according to other embodiments of the present invention. It should be noted that the functions noted in the blocks may occur out of the order noted in FIG. 5. Two (or more) blocks shown in succession may in fact be executed substantially concurrently or the blocks may sometimes be executed in the reverse order, depending on the functionality involved.

Initially, an opening is formed in the shell of an avian egg (Block 200). The opening may be formed in various ways including via a punch or other device known to those skilled in the art. In addition, the opening may be formed in any suitable location, e.g., in the side of the egg near the equatorial axis, at either end of the egg, etc. In a particular preferred embodiment of the invention, the opening in the egg shell is introduced at the upward facing portion of the shell of a generally horizontally positioned egg. However, embodiments of the present invention are not limited to any particular orientation of an egg.

According to embodiments of the present invention, the surface of an egg, at least around the site of formation of the opening for example, may be sanitized to reduce microbial (or other) contamination (e.g., with an alcohol or other sanitizing solution). However, sanitizing an egg, including the site of the opening, is not required with respect to embodiments of the present invention.

A needle with a lumen containing a fluid is inserted into the albumen of the egg via the opening (Block 205). The fluid within the needle lumen is pressurized (e.g., to about five to twenty inches of water) and the needle is moved into and through the albumen (Block 210). When fluid flow through the lumen is detected, the movement of the needle is stopped and the needle is correctly located within the subgerminal cavity of the egg (Block 215). A fluid material (e.g., fluid containing cells, vaccines, nucleic acids, proteins, peptides, viruses, antigens, hormones, growth factors, cytokines, etc.) is allowed to flow into the subgerminal cavity (Block 220). When a predetermined flow from the lumen into the subgerminal cavity is calculated based on the average flow rate via a flow sensor and the dispense time (Block 225), fluid delivery is stopped and the device is retracted from the egg (Block 230). The flow sensor signal is integrated to obtain the volume of fluid delivered. The opening in the egg shell may be sealed with a sealant (Block 235) and the egg may be incubated until hatch (Block 240).

According to other embodiments of the present invention, the flow rate to the subgerminal cavity may be increased by pressurizing the pressure reservoir (42, FIG. 3) when the needle is positioned in the albumen within an egg or once the needle is in the subgerminal cavity.

Referring to FIG. 6, a flow sensing system 300 configured to reliably and accurately detect when a needle tip is inserted within the subgerminal cavity of an avian egg, according to embodiments of the present invention, is illustrated. The illustrated system 300 includes a pressure regulator 302 that regulates flow of compressed gas (e.g., air) from a pressurized source, a mass flowmeter 304, a three-way valve 47, and a micropipette 30 (which serves the function of a needle described above). The micropipette 30 is configured to deliver material (e.g., cells, vaccines, nucleic acids, proteins, peptides, viruses, antigens, hormones, growth factors, cytokines, etc.) into the subgerminal cavity of an avian egg. The micropipette 30 containing the material to be delivered into an egg is pressurized via compressed gas from a compressed gas source to a predetermined pressure. This predetermined pressure is a pressure where fluid will not flow through the micropipette 30 when the micropipette tip is located in albumen but will flow through the micropipette 30 when the micropipette tip passes into the subgerminal cavity. The mass flowmeter (e.g., a gas mass flowmeter) 304 detects fluid flow through the micropipette 30 as the tip of the micropipette 30 moves into the subgerminal cavity (which causes the fluid to flow out of the micropipette 30). Although not illustrated, the flow sensing system 300 also may utilize a linear slide to accurately control movement of the micropipette 30.

In the illustrated embodiment, the three-way valve 47 is positioned between the flowmeter 304 and the source of fluid to be delivered into an egg. The fluid source may be a pump or other device configured to supply fluid or other material to the micropipette 30. The three-way valve 47 isolates the source of compressed air when fluid is loaded into the micropipette 30 and isolates the fluid source when the micropipette 30 is being pressurized.

The illustrated flow sensing system 300 is preferably under computer control. As such, a signal from the flowmeter 304 can be utilized to control movement of the micropipette 30.

Those skilled in the art will appreciate that methods of the present invention may be carried out on a plurality of eggs, e.g., in a commercial poultry operation. Moreover, the methods described herein may be fully manual, fully automated, or semi-automated.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

That which is claimed is:

1. A method of positioning a device within an egg, comprising:

forming an opening within a portion of the shell of the egg;

extending a device through the opening and into the egg, wherein the device comprises a needle having a lumen containing a fluid under pressure;

detecting a change in pressure of the fluid within the lumen; and stopping the movement of the device in response to detecting a change in pressure of the fluid within the lumen.

2. The method of claim 1, wherein the device comprises a substance delivery device and further comprising injecting a substance into the egg via the substance delivery device in response to stopping movement of the device.

3. The method of claim 2, wherein the substance is selected from the group consisting of cells, vaccines, nucleic acids, proteins, peptides, viruses, antigens, hormones, growth factors, and cytokines.

4. The method of claim 3, further comprising incubating the egg until hatch.

5. The method of claim 1, wherein the device comprises a substance removal device and further comprising removing a substance from the egg via the substance removal device in response to stopping movement of the device.

6. The method of claim 1, further comprising:
removing the device from the egg; and
sealing the opening in the egg shell.

7. The method of claim 5, wherein the removing step is performed in response to detecting that pressure of the fluid in the lumen has fallen to a predetermined level.

8. A method of positioning a substance delivery device within the subgerminal cavity of an avian egg, comprising:
forming an opening within a portion of the shell of the egg;
extending a substance delivery device through the opening and into albumen within the egg, wherein the substance delivery device comprises a needle having a lumen containing a fluid under pressure, and wherein the lumen comprises an outlet;
detecting a change in pressure of the fluid within the lumen; and
stopping movement of the substance delivery device through the albumen such that the lumen outlet is positioned within the subgerminal cavity in response to detecting a change in pressure of the fluid within the lumen.

9. The method of claim 8, further comprising injecting a substance into the subgerminal cavity via the substance delivery device in response to stopping movement of the device.

10. The method of claim 9, wherein the substance is selected from the group consisting of cells, vaccines, nucleic acids, proteins, peptides, viruses, antigens, hormones, growth factors, and cytokines.

11. The method of claim 8, further comprising:
removing the substance delivery device from the egg; and
sealing the opening in the egg shell.

12. The method of claim 11, further comprising incubating the egg until hatch.

13. The method of claim 11, wherein the removing step is performed in response to detecting that pressure of the fluid in the lumen has fallen to a predetermined level.

14. A method of positioning a device within an egg, comprising:
forming an opening within a portion of the shell of the egg;
extending a device through the opening and into the egg, wherein the device comprises a needle having a lumen containing a fluid under pressure, and wherein the lumen comprises an outlet;
detecting flow of the fluid through the lumen outlet; and
stopping movement of the device in response to detecting fluid flow.

15. The method of claim 14, wherein the device comprises a substance delivery device and further comprising injecting a substance into the egg via the substance delivery device in response to stopping movement of the device.

16. The method of claim 15, wherein the substance is selected from the group consisting of cells, vaccines, nucleic acids, proteins, peptides, viruses, antigens, hormones, growth factors, and cytokines.

17. The method of claim 14, wherein the device comprises a substance removal device and further comprising removing a substance from the egg via the substance removal device in response to stopping movement of the device.

18. The method of claim 14, further comprising:
removing the device from the egg; and
sealing the opening in the egg shell.

19. The method of claim 18, further comprising incubating the egg until hatch.

20. A method of positioning a substance delivery device within the subgerminal cavity of an avian egg, comprising:
forming an opening within a portion of the shell of the egg;
extending a substance delivery device through the opening and into albumen within the egg, wherein the substance delivery device comprises a needle having a lumen containing a fluid under pressure, and wherein the lumen comprises an outlet;
detecting flow of the fluid through the lumen outlet; and
stopping movement of the substance delivery device through the albumen such that the lumen outlet is positioned within the subgerminal cavity in response to detecting fluid flow.

21. The method of claim 20, further comprising injecting a substance into the subgerminal cavity via the substance delivery device in response to stopping movement of the device.

22. The method of claim 21, wherein the substance is selected from the group consisting of cells, vaccines, nucleic acids, proteins, peptides, viruses, antigens, hormones, growth factors, and cytokines.

23. The method of claim 20, further comprising:
removing the substance delivery device from the egg; and
sealing the opening in the egg shell.

24. The method of claim 23, further comprising incubating the egg until hatch.

25. An apparatus configured for use with an egg, comprising:
an extendable and retractable needle, wherein the needle comprises a lumen containing fluid under pressure; and
a pressure sensing system comprising a pressure transducer configured to detect a change in pressure of the fluid within the lumen as the needle moves through material in an egg, wherein the pressure sensing system is configured to stop movement of the needle in response to the pressure transducer detecting a change in pressure of the fluid.

26. The apparatus of claim 25, wherein the needle comprises a substance delivery device.

27. The apparatus of claim 25, wherein the needle comprises a substance removal device.

28. The apparatus of claim 25, further comprising a punch configured to form an opening in the shell of an egg.

29. An apparatus configured for use with an egg, comprising:
an extendable and retractable needle, wherein the needle comprises a lumen containing fluid under pressure; and a flow sensing system comprising a flow sensor configured to detect flow of fluid through the lumen as the needle moves through material in an egg, wherein the flow sensing system is configured to stop movement of the needle in response to the flow sensor detecting fluid flow.

30. The apparatus of claim 29, wherein the needle comprises a substance delivery device.

31. The apparatus of claim 29, wherein the needle comprises a substance removal device.

32. The apparatus of claim 29, further comprising a punch configured to form an opening in the shell of an egg.

33. The apparatus of claim 29, wherein the flow sensor comprises a gas mass flow sensor.

* * * * *